United States Patent [19]

Luebke

[11] Patent Number: 4,851,760
[45] Date of Patent: Jul. 25, 1989

[54] METHOD AND APPARATUS FOR MEASURING THE STRAIGHTNESS OF TUBES

[75] Inventor: John T. Luebke, Kennewick, Wash.

[73] Assignee: Sandvik Special Metals, Kennewick, Wash.

[21] Appl. No.: 222,053

[22] Filed: Jul. 21, 1988

[51] Int. Cl.[4] .......................................... G01R 27/26
[52] U.S. Cl. ................................ 324/61 R; 33/178 E;
    33/533; 340/870.37
[58] Field of Search ...................... 324/61 R, 513, 515,
    324/519; 340/870.37; 33/178 E, 533; 361/280,
    281; 73/104; 364/561

[56] References Cited

U.S. PATENT DOCUMENTS

| | | | |
|---|---|---|---|
| 1,893,074 | 1/1933 | Drake . | |
| 2,471,009 | 5/1949 | Reason . | |
| 2,604,512 | 7/1952 | Bacon et al. . | |
| 2,971,154 | 2/1961 | Lerner | 324/61 R |
| 3,187,253 | 6/1965 | Withmore | 324/61 R |
| 3,241,061 | 3/1966 | Quittner . | |
| 3,257,591 | 6/1966 | Hardy et al. | 324/61 R |
| 3,426,437 | 2/1969 | Rebhun et al. | 364/563 |
| 3,805,036 | 4/1974 | Michaud et al. | 33/533 |
| 4,011,500 | 3/1977 | Pelletier et al. | 324/61 R |
| 4,049,954 | 9/1977 | Vieira et al. | 340/1 Rg36 |
| 4,103,266 | 7/1978 | Fromson et al. | 324/61 R |
| 4,589,082 | 5/1986 | Parker et al. | 33/178 E |
| 4,687,107 | 8/1987 | Brown et al. | 209/556 |
| 4,696,190 | 9/1987 | Bucher et al. | 73/865.8 |

Primary Examiner—Reinhard J. Eisenzopf
Assistant Examiner—Anthony L. Miele
Attorney, Agent, or Firm—Burns, Doane, Swecker & Mathis

[57] ABSTRACT

An apparatus for use in measuring the straightness of a tube includes a flat support surface made of electrically insulative material and a plurality of strips of electrically conductive material oriented parallel to one another on the support surface. The strips are substantially uniform in shape and thickness, and a layer of dielectric material covers each of the strips of conductive material. The layers of dielectric material are of uniform thickness along the length of the strips and are adapted to support a tube to be tested for straightness so that a capacitor is formed by each of the strips and the tube. An oscillators is provided for generating pulses each having a pulse width proportional to the capacitance between at least one of the strips and the tube and representative of the size of gap between the at least one strip and the tube. These pulse widths are measured and compared with a preset value representative of a limit pulse width in order to determine the acceptability of the tube straightness. A method of measuring the straightness of a tube by measuring capacitances along the length of the tube as it rolls along a support surface is also disclosed.

15 Claims, 5 Drawing Sheets

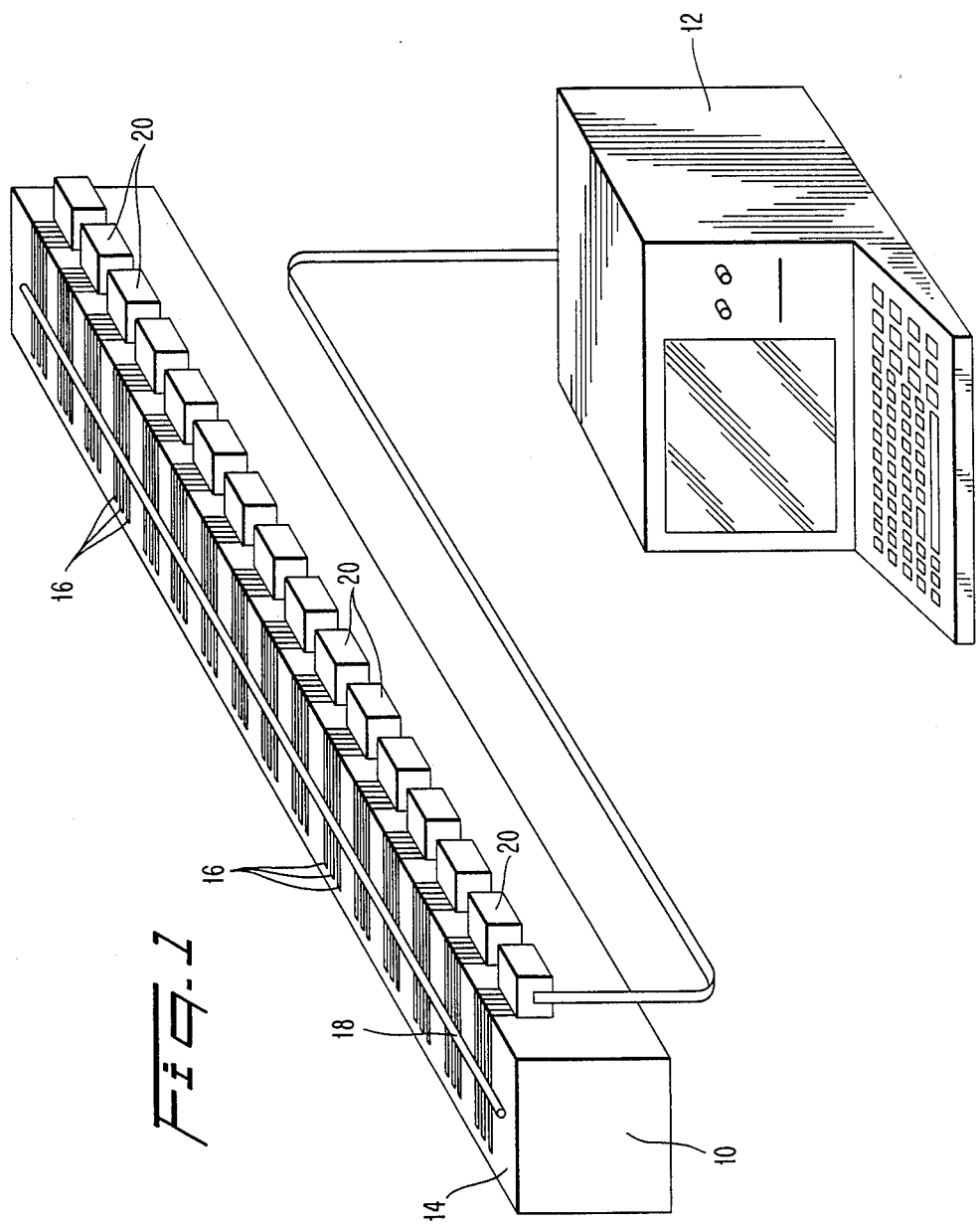

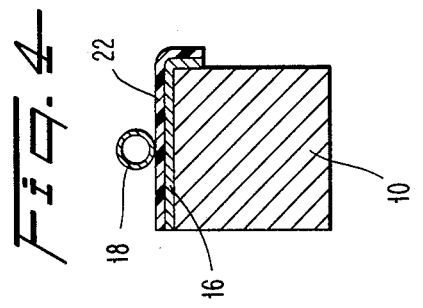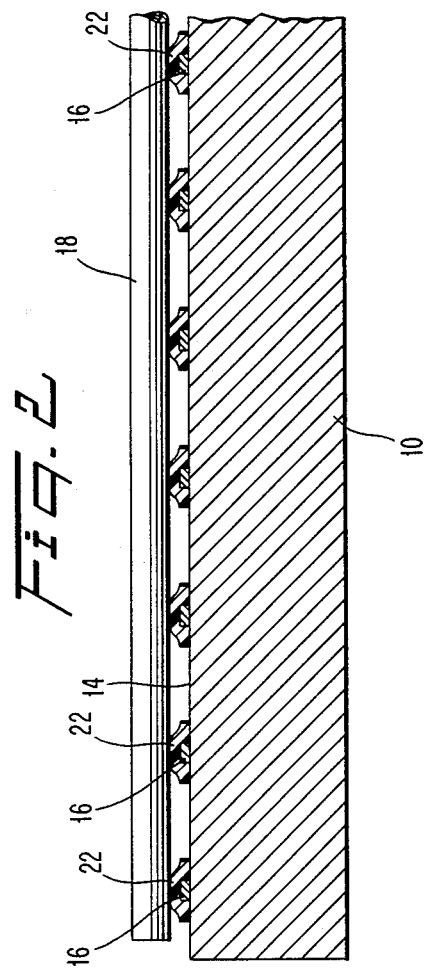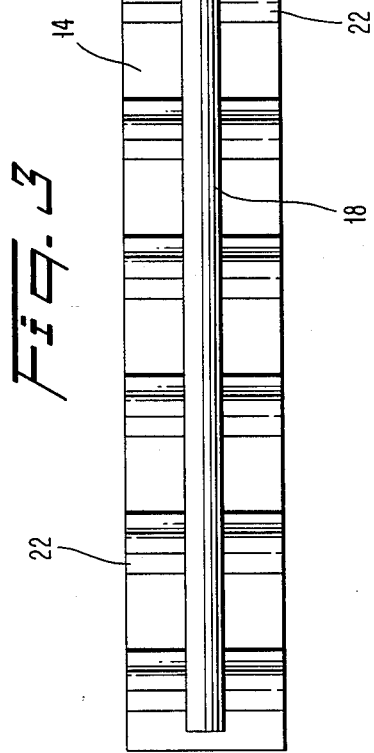

METHOD AND APPARATUS FOR MEASURING THE STRAIGHTNESS OF TUBES

BACKGROUND OF THE INVENTION

1. Field of the Invention

The present invention relates generally to measuring devices and, more particularly, to a method and apparatus for measuring the straightness of tubes.

2. Description of the Prior Art

Product specifications for precision tubing used in nuclear and aerospace applications, typically provide for straightness to be maintained along the tube length on the basis of a deviation per unit length of tubing. For example, a normal value for nuclear applications is 0.010 inch deviation per 12 inches of tube length.

In order to ensure proper quality control, it is required that manufacturers of aerospace and nuclear tubing certify that all tubing presented for customer acceptance has been tested for straightness and that all tubes meet the specified straightness criteria. Furthermore, the techniques and calibration methods employed by the manufacturers are subject to customer audit and approval. It is therefore, incumbent on the manufacturers to promote an accurate productive technique to check the straightness of precision aerospace and nuclear tubular product.

Presently, tubing is tested for straightness manually by rolling a tube across a reference surface plate and inserting a feeler gauge into the gaps occurring between the surface of the plate and the tube. Although all that is required with this method is a true flat surface and a set of feeler gauges, the method is time consuming and requires enough skill that a person carrying out the testing must have some training and experience to conduct the testing in a reasonable amount of time.

OBJECTS AND SUMMARY OF THE INVENTION

It is an object of the present invention to provide an improved, accurate, high speed technique for determining the straightness of tubular product. For example, it is an object of the invention to provide a technique by which a tube having a length of up to 16 feet may be measured in 3 to 5 seconds.

Also, it is an object of the invention to remove the subjectivity of straightness testing which is present in the manual method of testing discussed in the background, and to provide an apparatus which, due to its simplicity, has no moving parts and permits tubing of different diameters and lengths to be easily tested.

It is a further object of the invention to provide a method of measuring the straightness of tubing product which is simple enough that unskilled personnel may conduct the method.

The apparatus for use in measuring the straightness of a tube includes a support surface made of electrically insulative material. A plurality of strips of electrically conductive material are oriented parallel to one another at spaced intervals on the flat support surface. Covering each of the strips is a layer of dielectric material which is adapted to support a tube to be tested for straightness. Each of the strips of conductive material is adapted to form a capacitor with the tube when the tube is placed on the apparatus and each of these capacitors includes a gap defined by the thickness of the layer of dielectric material plus the distance separating the tube from the layer of dielectric material.

Also provided in the apparatus is a signal generating means for generating signals each having a parameter such as a pulse width or frequency which is proportional to the capacitance between at least one of the strips and the tube and which is representative of the size of the gap between the at least one strip and the tube. It is preferred that the width of each of the pulses be controlled through the use of a monostable oscillator as a pulse generator so that each pulse width may be measured by a measuring means, and compared by a comparing means with a preset value representative of a limit pulse width. The results of the comparison may be displayed so that an operator knows whether a tube being tested meets the preset criteria.

It is preferred that the strips be formed of metal and that the dielectric material consist of a plastic tape or the like. In addition, the support surface may be formed of granite or other material which is electrically insulative and preferably which has little or no magnetic conductivity. Further, a computer may by used to control the operations of the measuring apparatus and a monostable oscillator or a plurality of such oscillators may be used to generate the pulses described above.

In order for a circuit to be formed by the strips and the tube resting on the apparatus, it is possible to ground the tube resting on the apparatus by employing a brush ground which contacts the tube as it rolls across the apparatus. Alternatively, it is preferred that a first group of strips of conductive material be employed as the capacitors used in the oscillator circuit while the remaining or second group of capacitors serve as a ground. This object is achieved by electrically connecting the strips of the second group together and further connecting these strips to ground so that a complete circuit is formed by the grounded common capacitors, each of the first group of capacitors and an oscillator.

In accordance with the inventive method, a tube to be tested for straightness is rolled across a support surface having a plurality of strips of electrically conductive material supported at spaced intervals on the surface and a layer of dielectric material covering each of the strips. Pulses are generated each having a pulse width representative of a capacitance between at least one of the strips and the tube at different positions of the tube as it rolls along the support surface in a direction substantially parallel with the strips. The width of each of these pulses is measured and compared with a preset value representative of a limit pulse width, and the result of the comparison is indicated in some manner.

Several monostable oscillators are preferably provided in the inventive apparatus so that, in carrying out the inventive method, separate pulse generation may be carried out for each of a number of the plurality of strips. In addition, each of the plurality of separate oscillators may be controlled by a control means which selects an oscillator to be pulsed and activates that oscillator to generate a pulse. In one embodiment of the invention, the selection of the oscillators is sequential so that all of the oscillators located along the length of the tube are activated a number of times while the tube rolls across the table.

In addition, it is possible to sense when a tube is in contact with the table and when the tube has completed its travel across the table in order to control the start and finish of the testing operation. In this manner, it is possible to carry out subsequent automatic sorting operations on the tubes passing across the apparatus without further modification of the apparatus.

BRIEF DESCRIPTION OF THE DRAWING

A preferred embodiment of the invention is discussed in the following detailed description which should be considered in connection with the figures in the accompanying drawing, in which:

FIG. 1 is a schematic view of a tube straightness measuring apparatus constructed in accordance with the invention;

FIG. 2 is a cross-sectional view of a tube straightness measuring table made in accordance with the invention;

FIG. 3 is a plan view of the table shown in FIG. 2;

FIG. 4 is a cross-sectional end view of the table shown in FIG. 2;

DETAILED DESCRIPTION OF A PREFERRED EMBODIMENT

Figure 5:
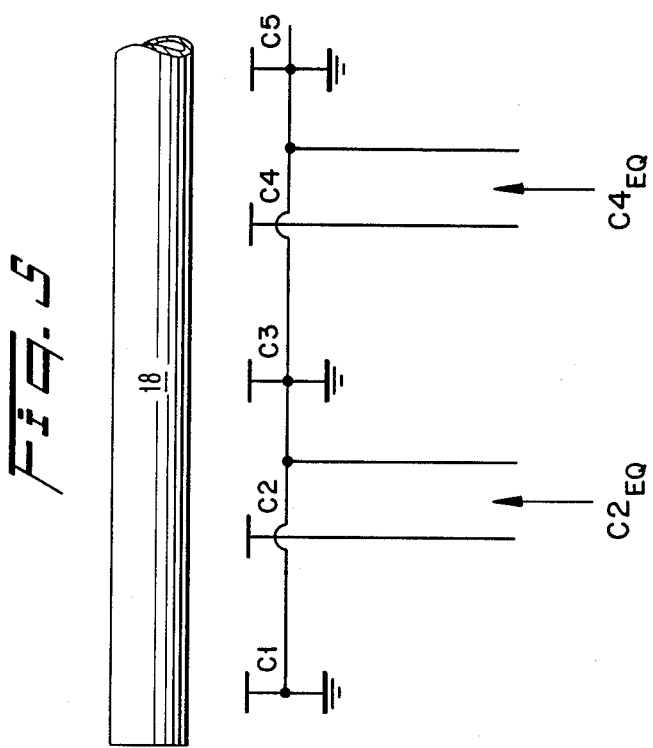
FIG. 5 is a schematic view of the capacitors employed in the tube straightness measuring apparatus of the invention.

A preferred embodiment of the inventive apparatus will be discussed with reference to FIGS. 1–7. As shown in FIG. 1, the apparatus includes a tube support table 10 and a processing and display unit 12.

The tube support table 10 is formed with a support surface 14 which is a true flat surface and which is electrically insulative. Granite is a favorable material for use as the support surface since it is both electrically and magnetically insulative and because it is a solid material capable of supporting large masses without losing its form or shape. The support surface 14 may be disposed in any plane, but it is preferred that the surface be disposed either horizontally or at a slight angle to the horizontal plane to permit tubular product to roll across the surface without any negative effects by the force of gravity that might cause the tube to lose contact with the table.

A plurality of strips 16 of electrically conductive material, each covered by a layer of dielectric material, are supported at spaced intervals on the support surface 14. These strips 16 are substantially uniform in shape and thickness and are oriented parallel to one another on the support surface 14. When a tube 18 is placed on the table 10, the tube forms a part of an electrical circuit with the strips 16 so that a plurality of capacitors are formed between the tube 18 and the plurality of strips. A number of pulse generators 20 are connected with the strips 16 and each generator produces pulses having pulse widths representative of the capacitance between at least one of the strips and the tube. These local capacitances, in turn, are proportional to the distance of separation between the tube and the strips, thus giving an indication as to how far a tube is raised up off of the table.

The processing and display unit 12 includes measuring means for measuring the width of the pulses generated by each of the pulse generators 20 and means for comparing the measured pulse widths with a preset value representative of a limit pulse width which is input prior to the testing operation and which is also representative of a limit gap size between the tube and the capacitors.

Control means are provided in the processing and display unit 12 to control the order in which the pulse generators 20 are operated so that pulses may be generated by each of the generators sequentially along the length of the tube 18 during testing. Such control permits the straightness of the tube to be determined by measuring and comparing the gap between the tube and the capacitors along the entire length of the tube at different rotational angles of the tube as it rolls across the table 10.

When the comparison is carried out between the measured pulse widths and the preset value, preferably by a digital computer, a signal is generated indicative of the result of the comparison so that, once the tube 18 has completed its travel across the table 10, the result of the straightness testing may be indicated in some manner by the display unit 12.

The construction of the table 10 is illustrated in FIG. 2, and includes the support surface 14, the strips 16 and the layers of dielectric material 22. The material used to make the strips 16 is preferably metal such as stainless steel. Standard feeler gauges which are commercially available and sold in uniform shapes and thicknesses may be employed as the strips in order to reduce the cost of producing the apparatus.

Covering each of the strips 16 of conductive material is a layer 22 of dielectric material which is of uniform thickness along the length of the strips 16. The dielectric material is adapted to support a tube to be tested for straightness and serves to separate the tube 18 from the strips 16 so that a capacitor is formed between each of the strips 16 and the tube 18. Each of these capacitors includes a gap between the strip 16 and the tube 18 which is defined by the thickness of the layer 22 of dielectric material plus the distance separating the tube 18 from the layer of dielectric material. Although separate pieces of the layer material are illustrated in the figures, it is possible to employ a single sheet of the layer material which may be laid across the table 10 in such a way as to cover all of the strips 16.

A tube 18 is illustrated in FIG. 2 which is shown as being perfectly straight so as to rest commonly on all of the layered strips without any gaps being formed between the tube and the layers 22 of dielectric material. When a tube resting on the table 10 is not perfectly straight, a portion of the tube will rise up off of some of the layered strips as the tube rolls across the table 10 and the gap between the tube 18 and the strips 16 located in the region of the curved section of tubing will increase. Such an increase in the size of the gap between the tube 18 and the strips 16 causes the capacitance therebetween to vary in such a way as to effect the pulse width of the pulses generated by the pulse generator or generators 20 associated with the capacitors in that region. If the pulse width of the generated pulses exceeds the limit value set by the operator in accordance with the desired specifications of the tubing, a reject signal will be displayed by the display unit 12.

In order that pulses generated by each pulse generator 20 remain consistent during the travel of the tubing across the table, the strips are arranged on the table in such a way that the tubing rolls across the table in a direction parallel to the length of the strips. In addition, the thickness and shape of the strips 16 and of the layers 22 thereon remains constant along the length of the strips so that the construction of the apparatus does not cause any undesired variations in the pulse widths generated by the generators 20 during a testing operation. The orientation of the layered strips with respect to the support surface 10 and the tubing is illustrated in FIG. 3. Further, the manner in which the thickness of each strip 16 and each layer 22 of dielectric material remains constant along the length of the strip is shown in FIG. 4.

The circuitry used to connect the strips 18 and tubing 18 to the pulse generators 20 is discussed with reference to FIG. 5. Each strip of a first group of the strips, designated as C2, C4, etc., is connected directly to a separate monostable oscillator powered through a power bus which is connected between the oscillator and the processing unit. A second group of strips C1, C3, C5, etc. are electrically connected together and lead to ground. Thus, a circuit is formed, e.g. in the region of the capacitor C2 which passes across the capacitor C2 into the tubing, back across the capacitors C1, C3, C5, etc. to ground. It is, of course, possible to use any conventionally known power source to power the oscillators, so long as some means is provided for controlling the time at which a pulse is to be output by each of the oscillators for comparison with the preset value in the comparing circuit.

Figure 6:
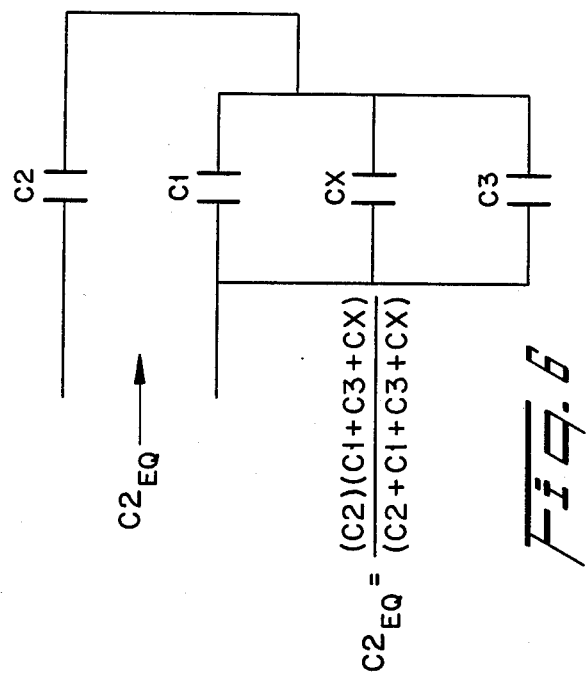
FIG. 6 is a circuit diagram of the capacitors shown in FIG. 5.

A schematic of the electrical equivalent of the local capacitance at C2 is shown in FIG. 6. A resultant capacitance $C2_{EQ}$, as received by the monostable oscillator, is a combination of the capacitance C2 and the capacitances C1, C3, C5, etc, and can be calculated by the following formula:

$$C_{EQ} = \frac{(C2)(C1 + C3 + CX)}{C2 + C1 + C3 + CX}$$

where CX is the summation of the capacitances of all of the capacitors other than C1 and C3 which are connected in parallel with C1 and C3. For example, as illustrated in FIG. 5, CX would be the summation of the capacitance of the capacitor C5 and all of the remaining capacitors connected in parallel with C1, C3 and C5 which are operable in the testing operation. Because the capacitance calculated from the addition of the capacitances C1, C3, etc., to CX is much greater than the capacitance of C2, the tube surface becomes a virtual ground with respect to the capacitor C2 and the short time constant of the monostable oscillator's RC network which generates a pulse having a width in the region of, e.g. 10 micro-seconds.

Figure 7:
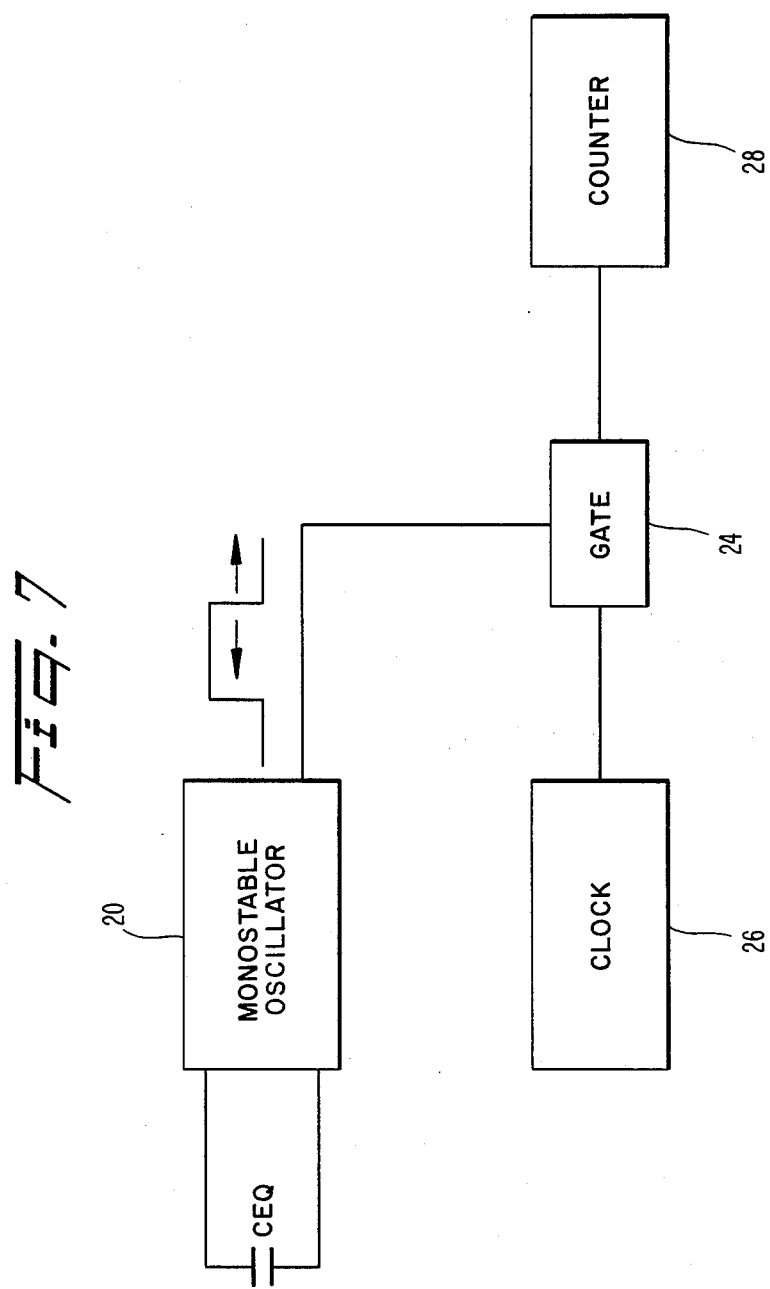
FIG. 7 is a circuit diagram of control circuitry employed in the inventive measuring apparatus.

As is shown in FIG. 7, each oscillator 20 is connected between one strip from the first group of strips C2, C4 etc., and a common wire connecting the second group of strips C1, C3, etc. together, so that the capacitance received by the oscillator is $C_{EQ}$. The oscillators 20 may each be constructed of any commercially available chip, such as a 555 timer chip available through any of several manufacturers, with the chip connected in a conventional manner as a square wave oscillator.

In order to employ pulses generated by each of the oscillators 20 along the length of a tube 18 resting or rolling on the table 10 in determining the straightness of the tube, control means are used to control when a given oscillator is to generate a pulse. It is preferred that each of the oscillator circuits includes a switch in the form of a transistor which may be turned on or off by the processing unit. In this manner, any desired oscillator may be selected and activated by the control means while all of the other oscillators remain off so that the processing unit can sequentially activate each of the oscillators along the length of the tube.

Once an oscillator has been selected by the processing unit, the transistor is turned on, thus enabling the oscillator to generate a pulse having a pulse width proportional to the gap between the tube and one of the capacitors C2, C4, etc., depending upon which of these capacitors is connected to the oscillator 20.

The outputs of all of the oscillators 20 are connected together in an "or" configuration so that the output of the selected oscillator is transmitted to an "and" gate 24 used in the measuring operation. A clock 26, such as a 50 MHz crystal oscillator, is connected to another input of the "and" gate so that during the time in which a pulse is being received from the oscillators 20, a number of clock pulses are input to the gate 24, thus generating a series of pulses at the output of the "and" gate 20. This series of pulses is counted by the counter 28 and is compared with the preset limit value stored in the digital computer of the processing unit.

Any conventional type of comparing circuitry may be employed to carry out the comparison so long as an output is available from the circuitry indicating the result of the comparison. This information is used to trigger a flag or other signal generating means which will permit an indication to be made of the acceptability or nonacceptability of the tubing. For example, if a required amount of deviation for a particular tubing product is 0.010 inches per 12 inches, a value which is representative of a pulse width corresponding to the limit deviation is input into the comparison circuit so that any measured pulse width larger than the limit value will signal an unacceptable product.

Figure 8:
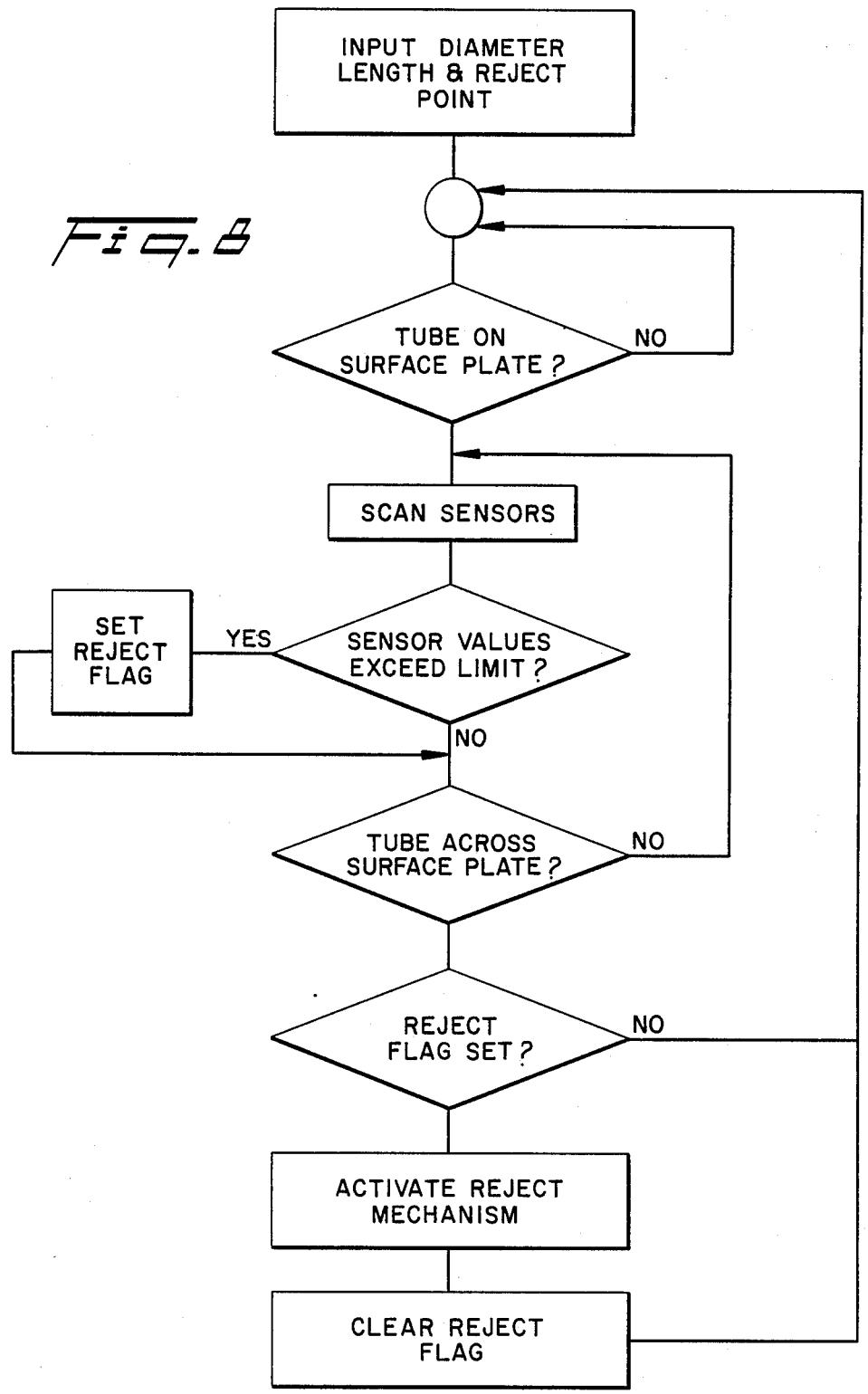
FIG. 8 is a flow diagram of the tube straightness measuring operation.

The method of carrying out the determination of straightness of a tube is discussed with reference to FIG. 8. Prior to placing a tube to be tested on the table 10 of the apparatus, information relating to the length and diameter of the tube or tubes to be tested is input into the computer to permit the computer to employ only those oscillators which underlie the tube as it rolls across the table. In addition, information relating to the requisite straightness of the tubing is input into the computer in the form of a limit pulse width so that a flag indicative of an unacceptable product will be properly generated for tubing which does not satisfy the necessary requirements.

Thereafter, a tube is placed on the table and is moved or permitted to roll across the table surface while the computer sequentially activates the oscillators along the length of the tube. Each pulse which is output by the oscillators is input in the "and" gate along with the clock pulses generated by the clock. The output of the "and" gate is input in the counter so that the counter has a count which is proportional to the pulse width of the addressed monostable oscillator. This number is then transferred to the data bus of the computer and is used by the computer program which serves as the comparator to discriminate the local straightness of the tube under test.

If any measured value compared with the preset value during testing exceeds the preset value, a reject flag is set which activates a reject mechanism or display after the test is complete. After each measured value is compared with the preset value, the next oscillator in line along the length of the tube is activated, and generates a pulse. The value of the counter activated by this pulse is again compared to the preset value. This procedure is rapidly repeated with each of the oscillators along the length of the tube being activated a number of times during its travel across the table 10 until a signal is received that the tube has been removed from the table, thus signalling that testing of the tube is complete. Thus, the method allows for interrogating the entire tube length for straightness values numerous times around the tube circumference as the tube rolls across the table 10.

Also, the processing unit 12, which preferably includes a computer, may be programmed to generate accept and reject flags which are interfaced with electric solenoids capable of activating pneumatic sorting mechanisms for automatically sorting acceptable and rejectable tubing.

While this invention has been illustrated and described in accordance with a preferred embodiment, it is recognized that variations and changes may be made and equivalents employed herein without departing from the invention as set forth in the claims. For example, although it is preferred that a pulse generator be employed that generates pulses having a pulse width proportional to the capacitance between the strips and the tube, it is within the scope of the present invention to employ, e.g. a stable oscillator which would generate a signal having a frequency proportional to the capacitance.

What is claimed is:

1. An apparatus for use in measuring the straightness of a tube, the apparatus comprising:
    a support surface made of electrically insulative material;
    a plurality of strips of electrically conductive material supported at spaced intervals on the support surface;
    a layer of dielectric material covering each strip of electrically conductive material, the layers of dielectric material being adapted to support a tube to be tested for straightness so that each of the strips of conductive material from a capacitor with the tube, wherein each capacitor includes a gap defined by the thickness of the layer of dielectric material plus the distance separating the tube from the layer of dielectric material;
    signal generating means for generating signals each having a parameter which is proportional to the capacitance between at least one of the strips and the tube and which is representative of the size of the gap between the at least one strip and the tube;
    measuring means for measuring the parameter of the signals generated by the signal generating means;
    comparing means for comparing the measured parameter of the signals with a preset value representative of a limit parameter; and
    display means for displaying the result of the comparison.

2. An apparatus for use in measuring the straightness of a tube, the apparatus comprising:
    a support surface made of electrically insulative material;
    a plurality of strips of electrically conductive material supported at spaced intervals on the support surface;
    a layer of dielectric material covering each strip of electrically conductive material, the layers of dielectric material being adapted to support a tube to be tested for straightness so that each of the strips of conductive material form a capacitor with the tube, wherein each capacitor includes a gap defined by the thickness of the layer of dielectric material plus the distance separating the tube from the layer of dielectric material;
    pulse generating means for generating pulses each having a pulse width which is proportional to the capacitance between at least one of the strips and the tube and which is representative of the size of the gap between the at least one strip and the tube;
    measuring means for measuring the width of the pulses generated by the pulse generating means;
    comparing means for comparing the measured widths of the pulses with a preset value representative of a limit pulse width; and
    display means for displaying the result of the comparison.

3. An apparatus as set forth in claim 2, wherein the support surface is flat and the plurality of strips are substantially uniform in shape and thickness, said layers of dielectric material being of uniform thickness along the length of the strips.

4. An apparatus as set forth in claim 2, wherein the strips are oriented parallel to one another on the support surface.

5. An apparatus as set forth in claim 4, wherein the strips are oriented parallel to one another on the support surface.

6. An apparatus as set forth in claim 2, wherein the strips of conductive material are formed of metal.

7. An apparatus as set forth in claim 2, wherein the layers of dielectric material are formed of plastic.

8. An apparatus as set forth in claim 2, wherein the support surface is formed of granite.

9. An apparatus as set forth in claim 2, wherein the pulse generating means includes a monostable oscillator.

10. An apparatus as set forth in claim 2, wherein a plurality of monostable oscillators are provided and the plurality of strips of electrically conductive material include a first group of strips and a second group of strips, the second group of strips being electrically connected together in parallel and being connected to each of the monostable oscillators, each of the first group of strips being connected to one of the monostable oscillators so that each monostable oscillator provides a pulse having a pulse width proportional to the capacitance between the strip of the first group connected thereto and the tube.

11. A method of measuring the straightness of a tube, comprising the steps of:
    rolling a tube across a support surface having at least one strip of electrically conductive material supported on the support surface and a layer of dielectric material covering the at least one strip;
    generating an electric signal proportional to the distance between the tube and the at least one strip at different positions of the tube as it rolls across the support surface;
    comparing the generated signal with a preset signal; and
    indicating the result of the comparison.

12. A method in accordance with claim 11, wherein said signal generating step includes the further step of sequentially activating a plurality of signal generators positioned along the length of the support surface a number of times during the travel of the tube across the support surface, said signal generators each being electrically connected with a different strip.

13. A method of measuring the straightness of a tube, comprising the steps of:

rolling a tube across a support surface having a plurality of strips of electrically conductive material supported at spaced intervals on the support surface and a layer of dielectric material covering each of the strips;

generating pulses each having a pulse width representative of a capacitance between at least one of the strips and the tube at different positions of the tube as it rolls across the support surface in a direction substantially parallel with the strips, said capacitance being proportional to the distance between the tube and the at least one strip;

measuring the width of the generated pulses;

comparing each of the measured pulse widths with a preset value representative of a limit pulse width; and indicating the result of the comparison.

14. A method as set forth in claim 13, further including the step of sensing whether a tube is present on the support surface.

15. A method as set forth in claim 13, wherein the pulse generating step further includes sequentially activating a plurality of pulse generators positioned along the length of the support surface a number of times during the travel of the tube across the support surface.

* * * * *